W. W. HENDERSON.
FLUID CLUTCH.
APPLICATION FILED OCT. 12, 1910.

1,032,283.

Patented July 9, 1912.
2 SHEETS—SHEET 2.

WITNESSES
C. H. Walker.
R. E. Fischer.

INVENTOR
Wm. W. Henderson
by Geo. E. Tew
Attorney

UNITED STATES PATENT OFFICE.

WILLIAM W. HENDERSON, OF WASHINGTON, DISTRICT OF COLUMBIA, ASSIGNOR TO HYDRAULIC CLUTCH DRIVE CO., OF WASHINGTON, DISTRICT OF COLUMBIA, A CORPORATION OF DELAWARE.

FLUID-CLUTCH.

1,032,283. Specification of Letters Patent. Patented July 9, 1912.

Application filed October 12, 1910. Serial No. 586,773.

*To all whom it may concern:*

Be it known that I, WILLIAM W. HENDERSON, a citizen of the United States, residing at Washington, District of Columbia, have invented certain new and useful Improvements in Fluid-Clutches, of which the following is a specification.

This invention relates to fluid clutches, and is especially adapted for use in connection with motor driven vehicles, but is not limited thereto, but may be applied as a connection between any driven and driving shaft.

As embodied the invention comprises an improvement on the hydraulic clutch shown in my U. S. Patent No. 879,045.

The hydraulic clutch embodied in the present device permits the driven shaft to be operated at any desired speed.

In the accompanying drawings—

Figure 1:
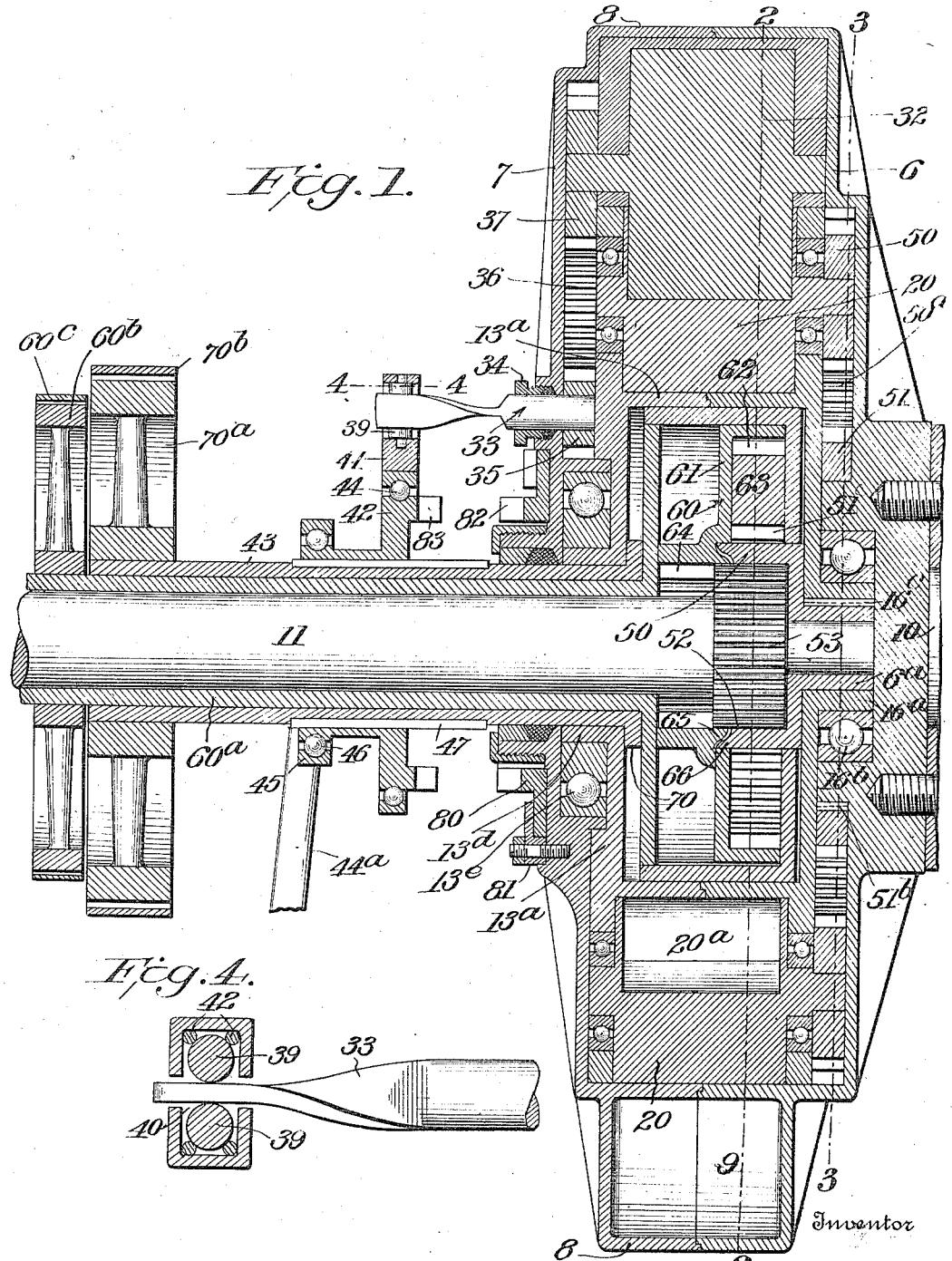
Figure 2:
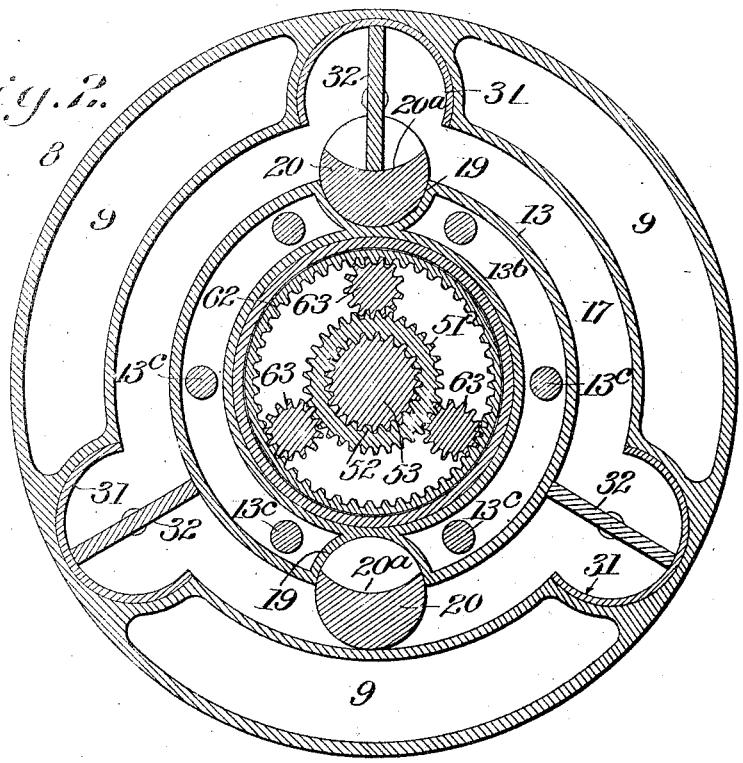
Figure 3:
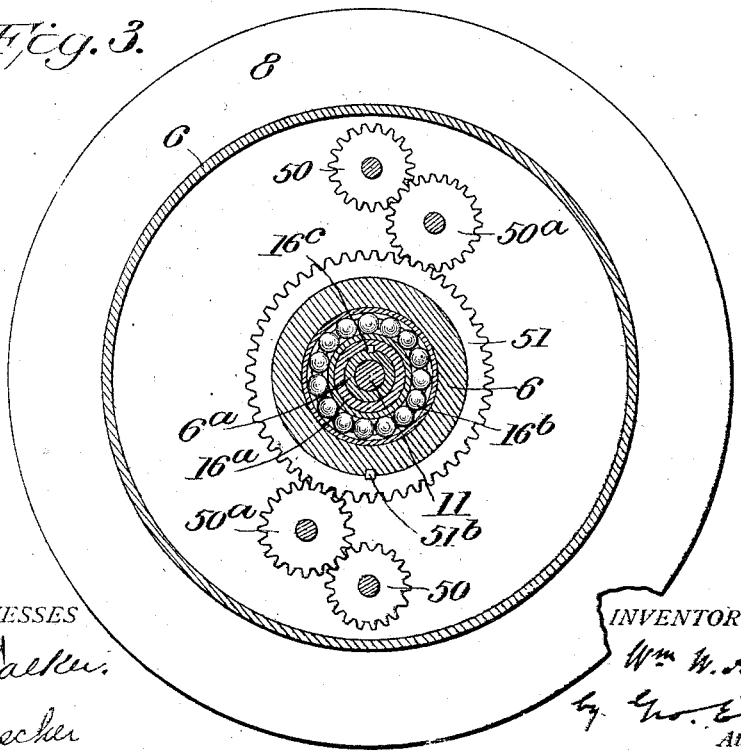

Figure 1 is a longitudinal section of the clutch and gearing. Fig. 2 is a section on the line 2—2 of Fig. 1, the clutch however being shown in closed position, instead of open as in Fig. 1. Fig. 3 is a section on the line 3—3 of Fig. 1. Fig. 4 is a section on the line 4—4 of Fig. 1.

Referring specifically to the drawings, 6 indicates the back plate of the clutch casing and 7 the front plate, and 8 the rim between the same. This rim may be made solid, or it may be cored out as indicated at 9. The engine or driving shaft 10 is bolted to the back of the plate 6, and thus the clutch casing is driven with said shaft. The driven shaft is indicated at 11 and projects through the front plate of the casing, where its reduced inner end finds a bearing in a neck 6ª at the back of a ring gear to be more fully hereinafter described. Fitting within the casing and against the back plate 6 is a circular plate 16 which joins an annular wall 13 which forms the inner wall of the annular fluid chamber 17, the outer wall of which is formed by the rim 8. At its front end the wall 13 joins a front plate 13ª. Said parts 16, 13, and 13ª form the inner clutch member or drum, and the wall 13 may be made hollow as indicated at 13ᵇ, to save weight, all of said parts being united by bolts 13ᶜ. The plate 16 has a neck 16ª sleeved on the neck 6ª, and is carried on ball bearings 16ᵇ between said neck and the back plate 6. The front plate 13ª has a neck 13ᵈ which is carried on ball bearings 13ᵉ between said neck and the front plate 7. The parts 6ª and 16ª are keyed together as indicated at 16ᶜ, and the inner clutch member or drum is thus free to rotate in the outer clutch casing.

The inner drum carries rolling pistons 20, which roll in the chamber 17 in a manner similar to that described in my said patents. They turn partly in recesses at 19 in the block 13 and are rotated by the same means described in my Patent No. 956,089. That is, there is a gear 50 on one trunnion of each piston, driven by a spur gear 51 through an intermediate idler 50ª, said gears being set in suitable recesses in the back plate. The annular spur gear 51 is keyed to the back plate 6 of the casing by a key 51ᵇ. When the valves 32 are open the gears 50 and 50ª cause the pistons 20 to roll around in the chamber 17, and by their movement force the fluid around through said chamber without movement of the driven parts. By closing the valves more or less the passage of the fluid will be obstructed to a greater or less extent, and consequently the motion will be transmitted at corresponding speed. In Fig. 2 the valves are shown closed and the fluid is thus trapped between the pistons 20 and the valves 32, to transmit the power. The pistons turn in order to pass the valves when they are partly closed.

Instead of the valved by-passes shown in my former patents I provide turning valves 32 arranged to project into and divide the chamber 17, said valves being set to work in segmental recesses 31 in the rim 8, and capable of being turned by means to be hereinafter described to more or less obstruct the flow of fluid in the chamber 17. The valves may project across said chamber, as shown in Fig. 2, to completely obstruct the same by contact with the wall 13, or they may be turned to permit more or less free passage. Three valves and two pistons are provided so that one piston is always active. The rolling pistons are recessed to pass the valves in any position of the latter, the inner surfaces of the recesses, indicated at 20ª, being a cycloidal curve described by the movement of a revolving and rotating point at the circumference of the valve.

Each valve is turned to open or close the same more or less, by means of a stem 33 arranged to turn in a gland at 34 in the front plate 7. At its inner end this stem has a pinion 35 which meshes with an idler 36 which in turn meshes with a gear 37 on the trunnion 38 of the valve, said gears being located in a suitable recess in the front plate 7. The outer end of the stem 33 is flattened on opposite sides and twisted to form, in effect, a screw of very high pitch, and the stem projects parallel to the axis of the shaft 11, the flattened part being held between rollers 39 set in recesses 40 in a ring 41, with balls 42$^a$ in the corners of the recesses, behind the rollers, to decrease friction. The ring 41 is mounted on a collar 42 on an outer sleeve 43, with ball bearings 44 between the ring and the collar, said collar also forming one member of a positive clutch to be hereinafter described. The collar 42 may be shifted lengthwise on the sleeve 43 by any appropriate means, such as a yoke lever 44$^a$ connected to a ring 45 supported on the collar on ball bearings 46, the collar being non-rotatable on the sleeve by means of a key 47, which however permits the collar to be slid lengthwise on the sleeve toward and from the casing.

When the collar is shifted, the ring 41 is also shifted, and the engagement of the rollers 39 against the flattened sides of the twisted stem 33 causes said stem (and each of them) to turn on its own axis, which by means of the connecting gears turns the valve 32. When the valves are fully open the liquid confined in the chamber 17 will be driven by the pistons 20 freely around in said chamber, and consequently no motion will be transmitted between the outer and the inner clutch members. But when the valves are closed more or less, such flow will be obstructed, and the resulting pressure will drive the inner member of the clutch to a corresponding extent, and when the valves are fully closed the liquid will be trapped and consequently the inner clutch member and driven shaft 11 will turn at the same speed as the outer clutch member and driving shaft 10, the motion being communicated through the plate 16, key 16$^c$ to neck 6$^a$. This neck, as above referred to, projects from a box gear 50$^c$ having external teeth 51$^c$ and internal teeth 52. These latter teeth mesh with a gear 53 integral with the shaft 11 and located at the inner end thereof, and when the teeth 52 and 53 are in mesh the motion of the piece 50$^c$ will be communicated to the shaft, directly. This produces a direct drive from the driven clutch member to the driven shaft.

For the reverse drive, the following means are provided: Mounted upon the inner end of the shaft 11 is a planetary gear box or casing 60, which incloses a compound gear box 61 having internal teeth 62 which mesh with the teeth of pinions 63 carried by said box, which pinions mesh also with the external teeth 51$^c$ on the box gear 50$^c$. The box gear 61 also has internal teeth 64 in a neck formed thereon, which are at all times in mesh with the teeth of the pinion 53. The box gear 61 has an annular groove 65 in which fits an annular lip 66 projecting from the box gear 50$^c$, which forms a bearing for the box gear 61 and retains the same in proper location and position, although even without said bearing it would run around on the pinions 63. The teeth of the pinion 53 are wider than those of the gear 52, but are of no greater width than the teeth of the gear 64. The shaft 11 is slidable lengthwise to change the drive from the direct to the reverse. When shifted inwardly to full extent as shown in Fig. 1 the pinion 53 engages the gear 52 for the direct drive as above explained. When shifted forwardly, the pinion 53 is withdrawn from engagement with the gear 52 and engages the gear 64 only. Therefore on the reverse drive the motion is communicated from the plate 16 to the piece 50$^c$ and through the gears 51$^c$, pinions 63, gear 62 and gear 64 to the pinion 53, the direction of rotation being reversed in consequence of the intermediate or planetary gearing. The constant engagement of the pinion 53 and gear 64, as above stated, is for the purpose of holding the pinion in line with the gear 64, so that the pinion may be shifted easily from the gear 52 to the gear 64; and in the direct drive such engagement is immaterial, since the box gear 61 and the parts carried thereby will simply rotate idly around with the shaft. During the reverse drive it is necessary that the casing 60 be held against rotation, and for this purpose it is provided with a sleeve 60$^a$ which fits over the shaft 11, and this sleeve has a brake wheel 60$^b$ which may be engaged by a brake band 60$^c$ controlled by a suitable lever or other device. The inner clutch member is also provided with a sleeve 43 fitting over the sleeve 60$^a$, this sleeve 43 being fastened to the front plate 13$^a$ by any suitable means, such for example as projections 70, so that this sleeve turns with the driven clutch member. The sleeve supports the collar 42 above mentioned and also provides means for the operation of a main brake used to brake the motion. This brake may consist of a wheel 70$^a$ on the sleeve and a band 70$^b$ operated by any suitable lever or device. When the brake is applied the motion in either direction is retarded to a corresponding extent, and the brake also serves to prevent rotation of the inner clutch member incident to friction of the fluid in the chamber 17 when the valves 32 are open, since this friction might tend to turn said inner clutch member.

The provision of a positive clutch referred to in my former patents, is retained. Thus a clutch ring 80 is fastened to the front plate 7 of the clutch casing by a clamping ring 81 bolted to said casing, and said clutch ring has projections 82 between which may be engaged corresponding projections 83 on the collar 42, when said collar is shifted in to full extent. Inasmuch as the valves 32 are closed by shifting in the collar 42 said collar positively clutches with the member 80 when the valves are fully closed, thus taking the strain from the liquid clutch, the power being transmitted directly from the clutch casing to the collar, key 47 and sleeve 43.

Changes in speed are provided for by manipulation of the valves 32, and direction of rotation is controlled by shifting the shaft 11 in or out, as above described.

The invention is not limited to the particular form described and shown, but various modifications may be made within the scope thereof.

It will be noted that the gears 52, 53 and 64 have the same function as interlocking clutch members, being made in the form of toothed gears for convenience of manufacture, and may be substituted by various forms of interlocking devices arranged for change from the direct to the reverse drive by shifting the shaft lengthwise.

Having thus described my invention, what I claim as new and desire to secure by Letters Patent is:—

1. In a fluid clutch, the combination of a driving member, and a driven member, with an annular fluid chamber between said members, a valve carried by one member and operating in said chamber and adjustable to control the flow of liquid in said chamber, and a rolling piston carried by the other member and arranged to roll around in said chamber, said piston being provided with means to cause it to pass said valve.

2. In a fluid clutch, the combination of a driving member and a driven member, with an annular fluid chamber between the same, a valve mounted in a recess in one of said members and movable into said chamber to control the flow of liquid therein, and a piston carried by the other member and rolling in said chamber in contact with the said members, to force the fluid around in said chamber, said piston having a recess through which the valve will pass to enable the piston to clear the valve.

3. In a fluid clutch, the combination of a driving member and a driven member, with an annular fluid chamber between the same, a valve carried in a recess in one member and arranged to project across said chamber and obstruct the flow of fluid therein, a piston carried by the other member and arranged to travel in said chamber, and means to turn the piston around the valve and in contact therewith, whereby the piston will pass the valve without movement of the latter.

4. In a fluid clutch, the combination of driving and driven members with an annular fluid chamber therebetween, a rotary valve mounted on one member and adapted to be turned to position across said recess to control the flow of fluid therein, a rolling piston in said chamber, said piston being carried by the other member and having a recess therein with an arcuate surface to pass the valve in contact therewith, and means actuated by relative movement of said members to rotate the piston.

5. In a fluid clutch, the combination of driving and driven members with a fluid chamber therebetween and means carried by one of said members to force a flow of fluid in said chamber, a turning valve controlling said flow, a shaft connected to one of said members, and means to operate the valve comprising a stem carried by one of said members and extending parallel to the shaft, said stem having a screw surface of high pitch, a shiftable ring extending around the shaft and having a recess, rollers at opposite sides of said recess, and bearing against said surface to turn the stem when the ring is shifted axially, and means to shift said ring.

6. In a fluid clutch, the combination with a casing and a rotary piston having a working chamber therebetween, of a valve carried by one of said members and arranged to block and unblock said chamber; a rotary abutment carried by the other of said members and normally blocking said working chamber, and provided with a peripheral pocket to permit the passage of said valve; and means for operating said valve.

In testimony whereof, I affix my signature in presence of two witnesses.

WILLIAM W. HENDERSON.

Witnesses:
MARY L. TEW,
GEO. E. TEW.